(12) United States Patent
Mizokane et al.

(10) Patent No.: US 12,103,352 B2
(45) Date of Patent: Oct. 1, 2024

(54) LOWER VEHICLE-BODY STRUCTURE OF VEHICLE

(71) Applicant: Mazda Motor Corporation, Hiroshima (JP)

(72) Inventors: Michiya Mizokane, Aki-gun (JP); Hidetaka Yamamoto, Aki-gun (JP); Seiichi Imajyo, Aki-gun (JP); Takashi Okada, Aki-gun (JP); Yuki Ikawa, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/882,599

(22) Filed: Aug. 8, 2022

(65) Prior Publication Data

US 2023/0070828 A1 Mar. 9, 2023

(30) Foreign Application Priority Data

Sep. 3, 2021 (JP) ................. 2021-143662

(51) Int. Cl.
*B60G 3/20* (2006.01)
*B62D 21/11* (2006.01)

(52) U.S. Cl.
CPC .............. *B60G 3/20* (2013.01); *B62D 21/11* (2013.01)

(58) Field of Classification Search
CPC ........... B60G 3/20; B62D 21/11; B62D 35/02
See application file for complete search history.

(56) References Cited

U.S. PATENT DOCUMENTS

| 9,902,225 | B2 * | 2/2018 | Riegelsberger | ........ B62D 35/02 |
| 10,246,136 | B2 * | 4/2019 | Scholz | .................. B62D 35/02 |
| 2019/0199133 | A1 * | 6/2019 | Yuasa | .................... H02J 50/10 |

FOREIGN PATENT DOCUMENTS

| JP | 2019-177775 A | 10/2019 | |
| JP | 2019166988 A | * 10/2019 | ............. B60G 7/001 |

OTHER PUBLICATIONS

JP2019166988A Machine English translation (Year: 2018).*
JP2019166988A Machine English translation (Year: 2019).*

* cited by examiner

*Primary Examiner* — Jason D Shanske
*Assistant Examiner* — Matthew James O'Neill
(74) *Attorney, Agent, or Firm* — XSENSUS LLP

(57) ABSTRACT

A lower vehicle-body structure of a vehicle, in which plural sets of suspension links included in a rear suspension apparatus may be provided so as to extend to a vehicle-width-direction inner side from a lower position of respective wheel wells. A set of a pair of left and right first suspension links out of the suspension links may be respectively configured in a U-shape of which upper surface is opened in cross-section, and a first undercover structure that covers a vehicle-body lower surface so as to be flush with a lower surface of each of the first suspension links may be provided on a side portion of the first suspension link.

16 Claims, 6 Drawing Sheets

LOWER VEHICLE-BODY STRUCTURE OF VEHICLE

CROSS-REFERENCE TO RELATED APPLICATION

The present application claims priority to Japanese patent application JP 2021-143662, filed Sep. 3, 2021, the entire contents of which being incorporated herein by reference in its entirety.

TECHNICAL FIELD

The present disclosure relates to a lower vehicle-body structure of a vehicle in which plural sets of suspension links included in a rear suspension apparatus are provided so as to extend to the vehicle-width-direction inner side from a lower position of a wheel well.

BACKGROUND ART

In general, a rear suspension apparatus includes plural sets of suspension links that extend to the vehicle-width-direction inner side from a lower position of a wheel well.

When underfloor traveling air from the vehicle-body lower side becomes entrained with respect to the abovementioned rear suspension apparatus and peripheral portions thereof, the deterioration of the aerodynamic characteristics is caused. In order to solve the problem as above, an undercover has been mounted on a lower portion of a suspension link as disclosed in Patent Literature 1. However, there has been a problem in that a relatively large undercover member is needed for the lower portion of the suspension link, and it becomes disadvantageous in terms of weight and cost.

CITATION LIST

Patent Literature

[Patent Literature 1] Japanese Patent Laid-Open. No. 2019-177775

SUMMARY

Problems to be Solved by the Disclosure

Thus, an object of the present disclosure is to provide a lower vehicle-body structure of a vehicle capable of suppressing the deterioration of aerodynamic characteristics at a space-saving undercover member utilizing a lower surface of a suspension link by the undercover member flush with the lower surface of the suspension link.

Means for Solving the Problems

One embodiment of the present disclosure is a lower vehicle-body structure of a vehicle, the lower vehicle-body structure being provided with plural sets of suspension links included in a rear suspension apparatus, the plural sets of suspension links being provided so as to extend to a vehicle-width-direction inner side from a lower position of respective wheel wells. The lower vehicle-body structure is characterized in that: a set of a pair of left and right first suspension links out of the suspension links is respectively configured in a U-shape of which upper surface is opened in cross-section; and a first undercover member that covers a vehicle-body lower surface so as to be flush with a lower surface of each of the first suspension links is provided on a side portion of the first suspension link.

The abovementioned rear suspension apparatus may be a multi-link rear suspension apparatus. The abovementioned first suspension link may be set to be a lower lateral link.

By the embodiment of the present disclosure, the deterioration of the aerodynamic characteristics can be suppressed by the space-saving first undercover member effectively utilizing the lower surface of the first suspension link by the first undercover member flush with the lower surface of the first suspension link.

In other words, the lower surface of the first suspension link is utilized as a part of the undercover portion. Therefore, the area of the first undercover member can be reduced by the amount, thereby saving space. In addition, a case where the underfloor traveling air becomes entrained by the rear suspension apparatus and peripheral parts thereof can be suppressed by the first undercover member.

As an aspect of the present disclosure, a second undercover member that covers the vehicle-body lower surface so as to be flush with the lower surface of the abovementioned first suspension link may be provided on each of another set of a pair of left and right second suspension links positioned on a vehicle front side of the abovementioned first suspension links out of the abovementioned suspension links.

The abovementioned second suspension links may be set to be lower trailing links in the multi-link rear suspension apparatus.

By the aspect of the present disclosure, the deterioration of the aerodynamic characteristics can be further suppressed by the second undercover member and the first undercover member positioned on the front side and the rear side.

As an aspect of the present disclosure, a third undercover member that covers the vehicle-body lower surface may be provided on at least the vehicle-width-direction inner side of the second undercover member.

By the aspect of the present disclosure, the rectification effect of the underfloor traveling air can be further improved together with each of the first and second undercover members serving as other undercover members.

As an aspect of the present disclosure, a curvature portion may be formed in the first undercover member along a curvature shape of a lower surface of the first suspension link.

By the aspect of the present disclosure, the curvature portion of the first undercover member extends along the curvature shape of the lower surface of the first suspension link, and hence the rectification function of the underfloor traveling air can be ensured.

As an aspect of the present disclosure, a plurality of ribs that extend in a front-rear direction of the vehicle so as to protrude to a vehicle lower side may be provided on a lower surface of the second undercover member.

By the aspect of the present disclosure, a case where the underfloor traveling air that flows toward the rear side from the front side through the lower portion of the second undercover member is released to the left and right in the vehicle width direction can be suppressed by the ribs, thereby improving the rectification effect.

Advantageous Effect of Disclosure

According to the present disclosure, the deterioration of the aerodynamic characteristics can be suppressed at the space-saving undercover member utilizing the lower surface of the suspension link by the undercover member flush with the lower surface of the suspension link.

MODES FOR CARRYING OUT THE DISCLOSURE

An object of suppressing the deterioration of aerodynamic characteristics at a space-saving undercover member utilizing a lower surface of a suspension link by the undercover member or structure flush with the lower surface of the suspension link is attained by a lower vehicle-body structure of a vehicle, the lower vehicle-body structure being provided with plural sets of suspension links included in a rear suspension apparatus, the plural sets of suspension links being provided so as to extend to a vehicle-width-direction inner side from a lower position of respective wheel wells. The lower vehicle-body structure of a vehicle is characterized in that: a set of a pair of left and right first suspension links out of the suspension links is respectively configured in a U-shape of which upper surface is opened in cross-section; and a first undercover member or structure that covers a vehicle-body lower surface so as to be flush with a lower surface of each of the first suspension links is provided on a side portion of the first suspension link.

EMBODIMENT

One embodiment of the present disclosure is described in detail with reference to the drawings below.

Figure 1:
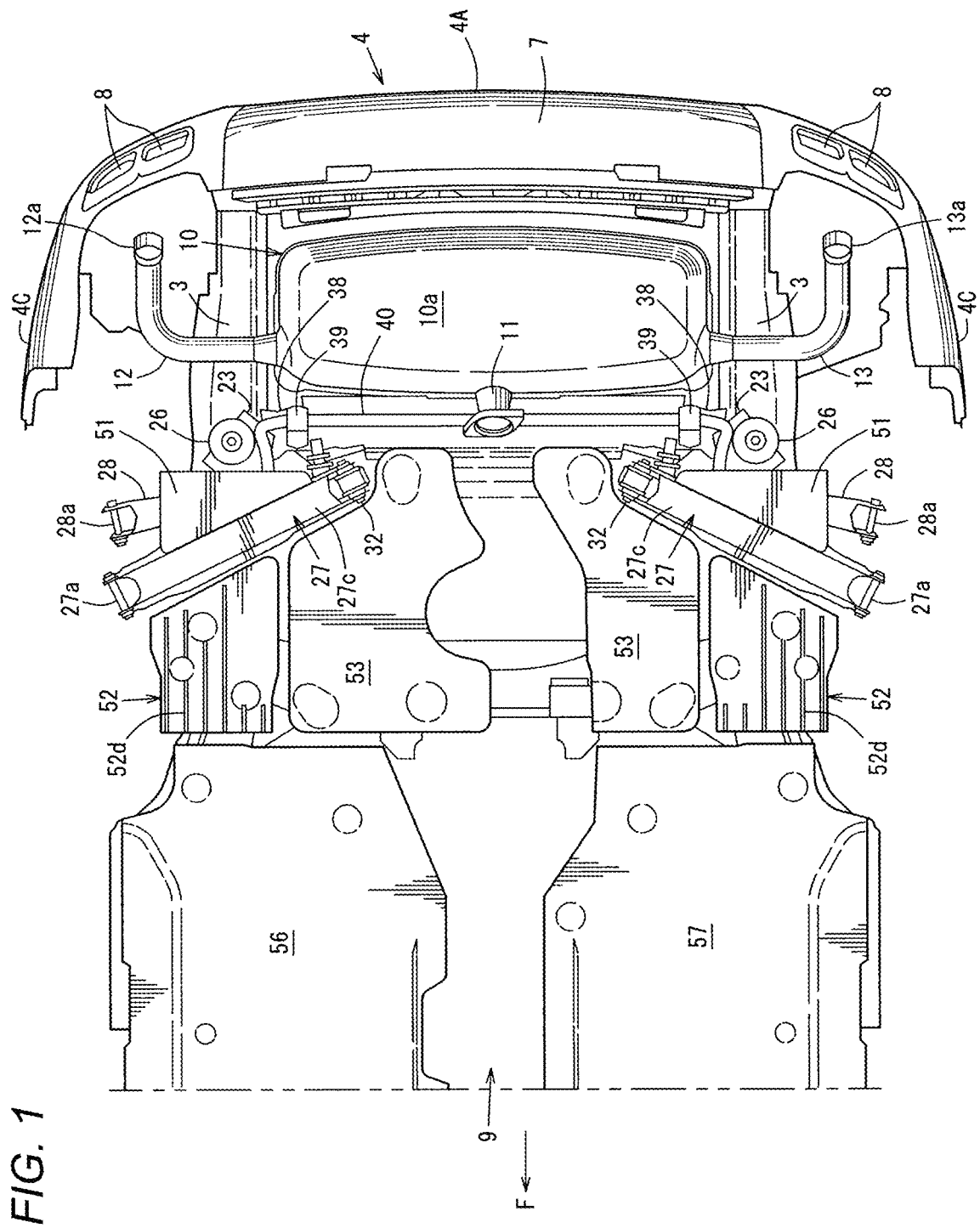
FIG. 1 is a bottom view of a lower vehicle-body structure of a vehicle according to some embodiments of the present disclosure.
Figure 2:
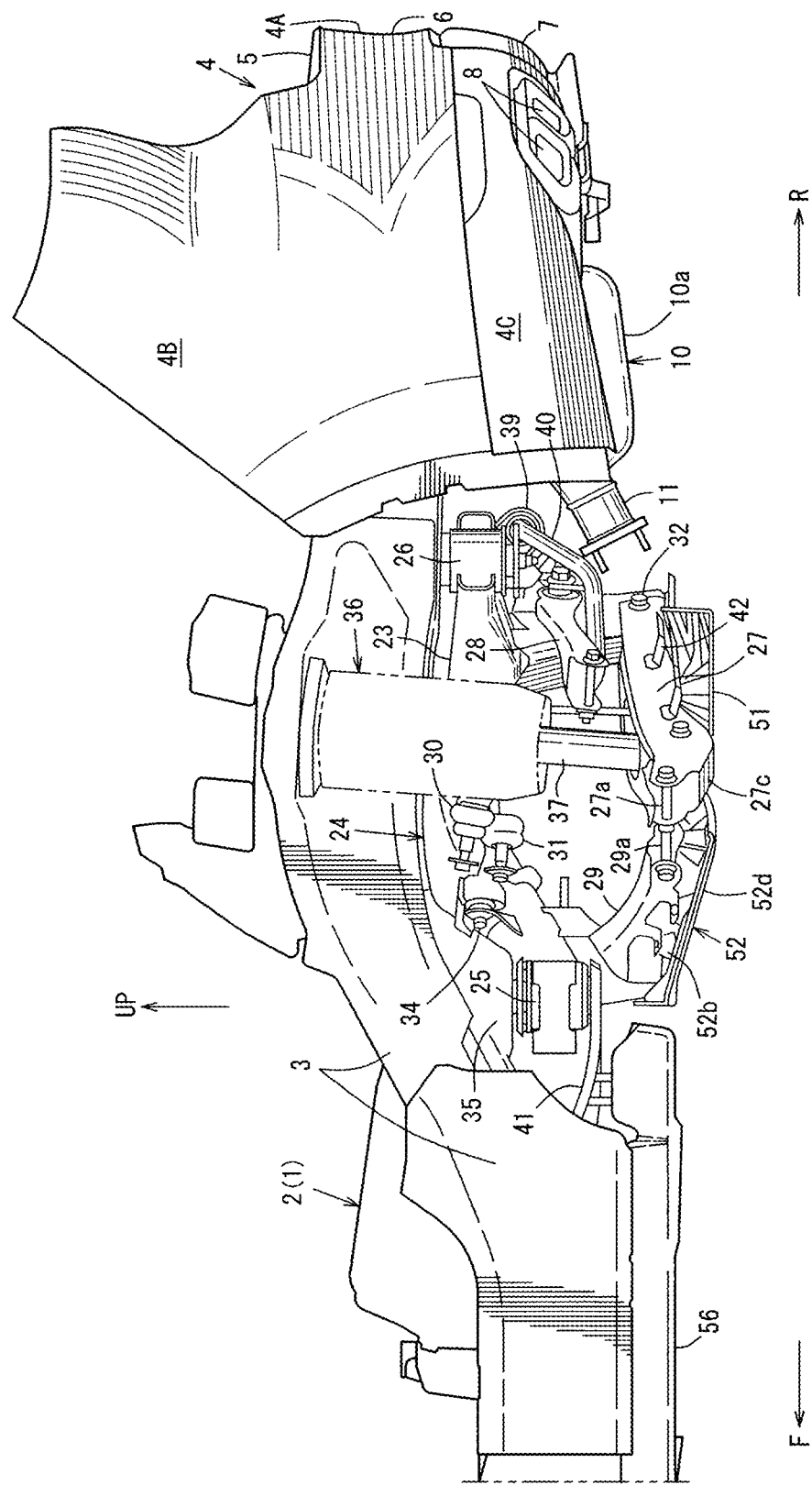
FIG. 2 is a side view of the vehicle left side illustrating the lower vehicle-body structure of the vehicle according to some embodiments of the present disclosure.
Figure 3:
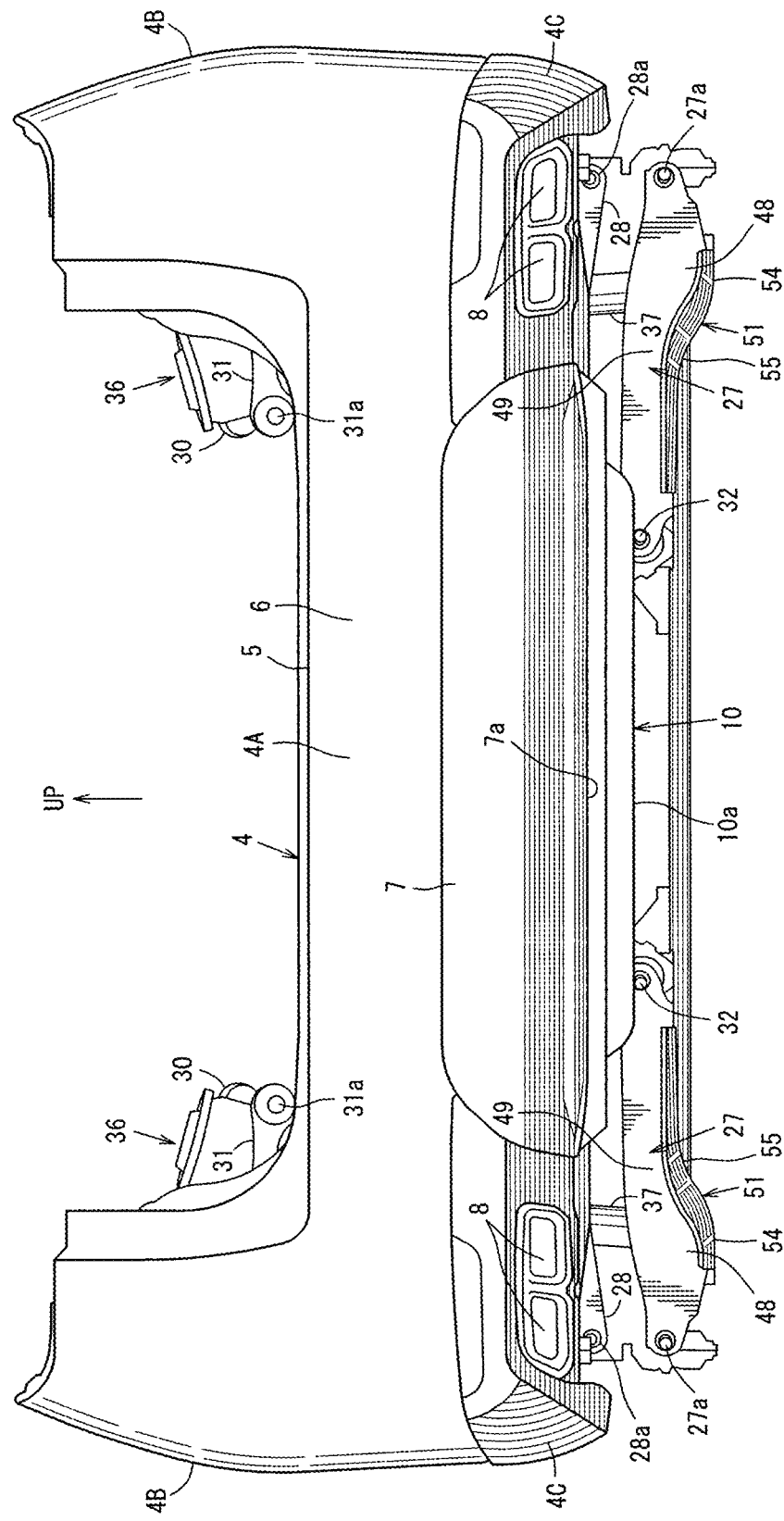
FIG. 3 is a rear view of the lower vehicle-body structure of the vehicle according to some embodiments of the present disclosure.
Figure 4:
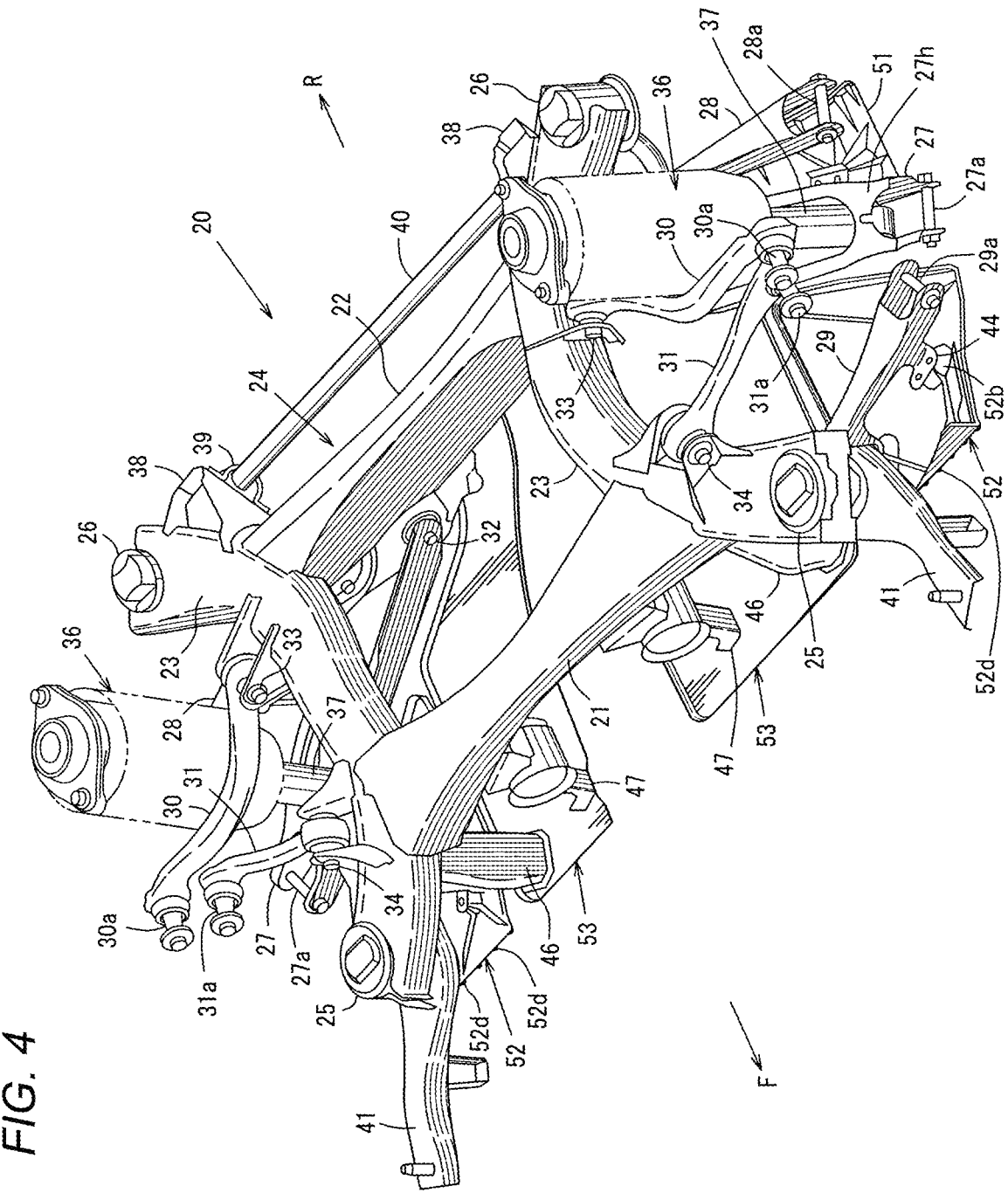
FIG. 4 is a perspective view illustrating a rear suspension apparatus according to some embodiments of the present disclosure.
Figure 5:
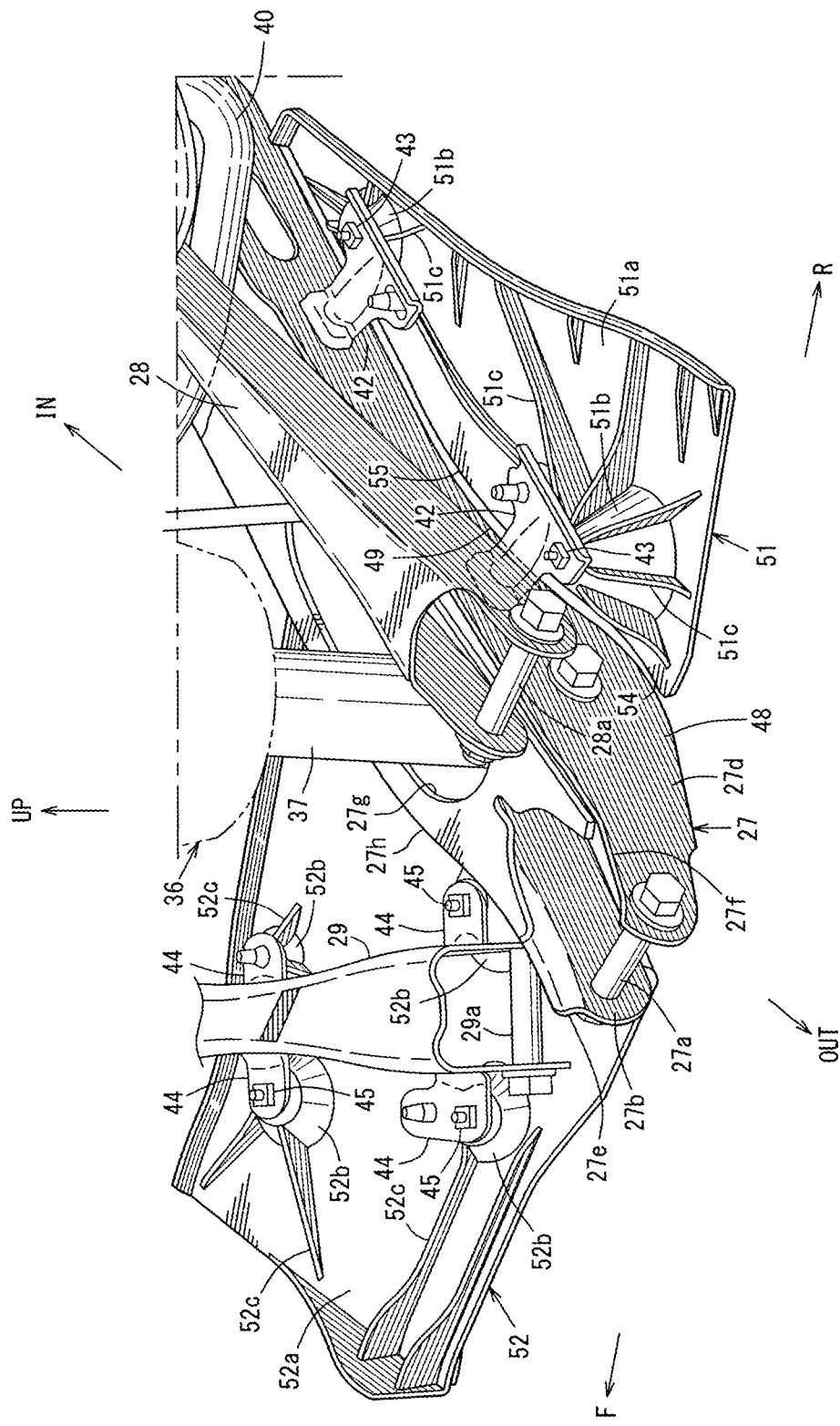
FIG. 5 is a main-part perspective view illustrating a mounting structure of each of first and second undercovers according to some embodiments of the present disclosure.
Figure 6:
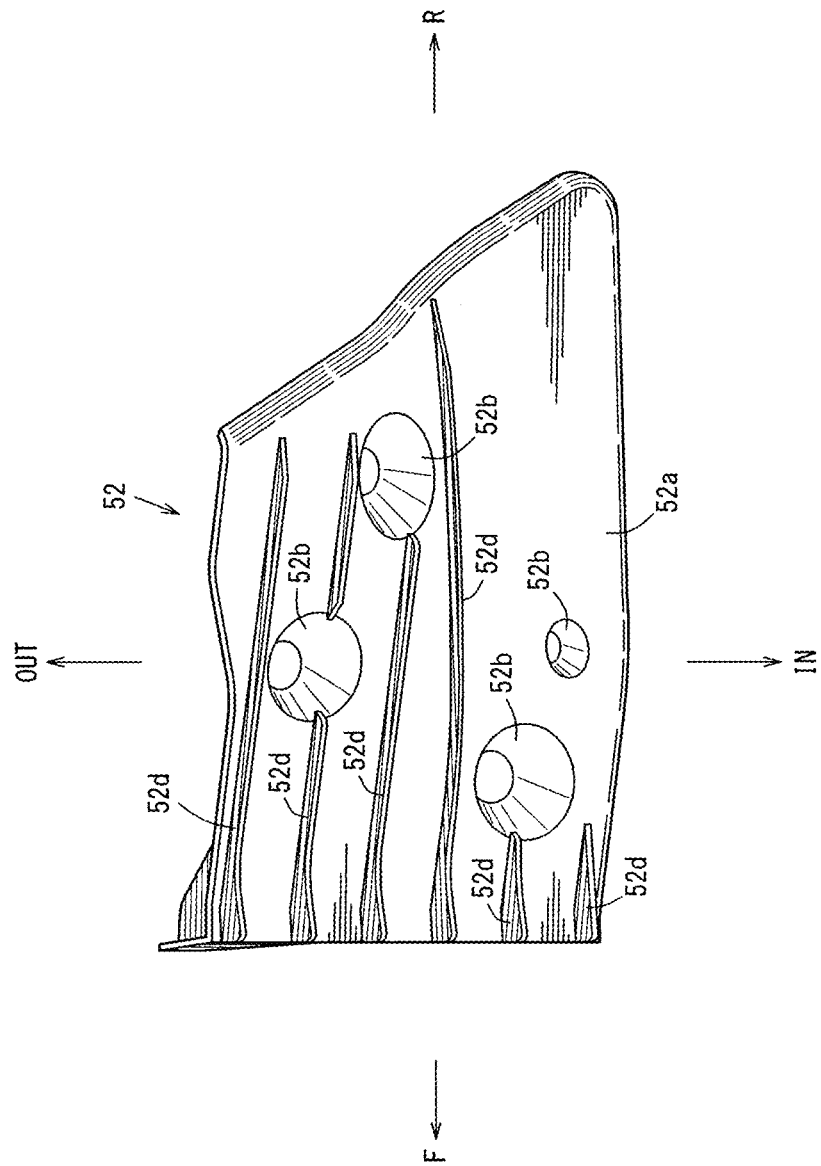
FIG. 6 is a bottom perspective view of the second undercover according to some embodiments of the present disclosure.

The drawings illustrate a lower vehicle-body structure of a vehicle according to some embodiments of the present disclosure. FIG. 1 is a bottom view of the lower vehicle-body structure of the vehicle according to some embodiments of the present disclosure. FIG. 2 is a side view of the vehicle left side illustrating the lower vehicle-body structure of the vehicle according to some embodiments of the present disclosure. FIG. 3 is a rear view of the lower vehicle-body structure of the vehicle according to some embodiments of the present disclosure. FIG. 4 is a perspective view illustrating a rear suspension apparatus according to some embodiments of the present disclosure. FIG. 5 is a main-part perspective view illustrating a mounting structure of each of first and second undercovers according to some embodiments of the present disclosure. FIG. 6 is a bottom perspective view of a second undercover according to some embodiments of the present disclosure.

In FIG. 2, a kick-up portion that rises upward from a rear end of a front floor panel is provided, and a rear floor panel 1 that extends rearward from the kick-up portion is provided in the kick-up portion. The rear floor panel 1 forms floor surfaces of a vehicle cabin and a trunk, and a rear seat pan 2 is integrally formed on the rear floor panel 1.

From a rear end portion of the rear floor panel 1 to a rear end portion of the front floor panel, rear side frames 3 each having a front-rear two-part split structure that extend in the front-rear direction of the vehicle are provided on both of left and right vehicle-width-direction end portions of those floor panels.

Side sills (not shown) that extend to the vehicle front side to be continuous from the rear side frames 3 are provided, and rear end portions of the side sills are provided so as to overlap with front end portions of the rear side frames 3. The rear side frames 3 and the side sills described above are all vehicle-body strength members.

Meanwhile, as illustrated in FIG. 1 to FIG. 3, a rear bumper 4 is installed on a rear portion of the vehicle so as to mitigate shock at the time of collision from the rear side.

The rear bumper 4 is an injection molded article of resin installed along a lower end portion of the rear portion of the vehicle. The rear bumper 4 covers a vehicle-body rear structure formed by a rear bumper reinforcement, a rear portion of the rear floor panel 1, a rear portion of the rear side frame 3, a rear end panel, and the like, and a silencer 10 described below from the rear side.

As illustrated in FIG. 1 to FIG. 3, the rear bumper 4 has a main wall portion 4A that covers an intermediate portion of the vehicle-body rear structure in the vehicle width direction, and side wall portions 4B that cover left and right corner portions in the vehicle-body rear structure by wrapping therearound to the vehicle front side from vehicle-width-direction end portions of the main wall portion 4A.

As illustrated in FIG. 3, the main wall portion 4A of the rear bumper 4 is configured by an upper wall portion 5, an intermediate wall portion 6, and a lower wall portion 7. The upper wall portion 5 has an upper end portion mounted along an upper end portion of a rear end panel. The intermediate wall portion 6 extends in the up-down direction and the vehicle width direction to be continuous from a lower portion of the upper wall portion 5. The lower wall portion 7 extends in the up-down direction and the vehicle width direction to be continuous from a lower portion of the intermediate wall portion 6. A lower end portion 7a of the lower wall portion 7 is positioned on the rear side of the rear end panel in the front-rear direction and is positioned on the lower side of the rear floor panel 1 in the up-down direction.

The rear bumper 4 has lower corner walls 4C continuous with vehicle-width-direction outer portions of the lower wall portion 7 and lower portions of the side wall portions 4B, and openings 8 from which exhaust gas exhausted from tail pipes 12, 13 described below is discharged to the vehicle rear side are formed in rear surface portions of those lower corner walls 4C.

The vehicle of the present embodiment is a front-engine rear-drive (front-engine rear-wheel drive) type, that is, a so-called FR-type. Therefore, in the vehicle-width-direction center of the front floor panel, a tunnel portion 9 that extends in the front-rear direction of the vehicle and protrudes to the vehicle cabin side is provided (see FIG. 1).

As illustrated in FIG. 1, on the lower front side of the rear bumper 4, the silencer 10 serving as a silencing apparatus transversely disposed so as to extend in the vehicle width direction is provided.

As illustrated in the same drawing, in the vehicle-width-direction center of a front portion of the silencer 10, the silencer 10 has an inlet pipe 11 that introduces exhaust gas into the silencer 10. On both of left and right end portions of the silencer 10 in the vehicle width direction, the tail pipes 12, 13 each having an L-shape in bottom view are provided. Rear end portions 12a, 13a of the tail pipes 12, 13 face the openings 8 in the rear bumper 4. As illustrated in FIG. 1 to FIG. 3, a lower surface 10a of the silencer 10 is formed in a substantially flat shape.

On lower portions of the pair of left and right rear side frames 3, a rear suspension apparatus 20 that independently suspends left and right rear wheels (not shown) is provided (see FIG. 4). In the embodiment, a multi-link rear suspension is employed as the rear suspension apparatus 20.

As illustrated in FIG. 4, the rear suspension apparatus 20 includes a suspension cross member 24 (so-called subframe) in which a front cross member 21, a rear cross member 22, and a pair of left and right side cross members 23, 23 are combined in a well crib form in vehicle plan view.

The front cross member 21 connects front sides of the pair of left and right side cross members 23, 23 to each other in the vehicle width direction. The rear cross member 22 connects rear sides of the pair of left and right side cross members 23, 23 to each other in the vehicle width direction.

The side cross members 23 extend in the vehicle front-rear direction. Parts in the side cross members 23 on the front side of sections connected to the front cross member 21 extend to the vehicle front side and the vehicle-width-direction outer side. Vehicle-body mounting members 25 are provided on front end portions of the side cross members 23.

Parts in the side cross members 23 on the rear side of sections connected to the rear cross member 22 extend to the vehicle rear side and the vehicle-width-direction outer side. Vehicle-body mounting members 26 are provided on rear end portions of the side cross members 23.

The multi-link rear suspension includes five suspension links on each of the left and right sides. Those five suspension links have three lower links positioned on the lower side and two upper links positioned on the upper side, and the suspension cross member 24 and wheel support members (not shown) of the rear wheels are connected to each other by the five suspension links 27 to 31 on each side.

The three lower links positioned on the lower side include a lower lateral link 27, a toe control link 28 positioned on the rear side of the lower lateral link 27, and a lower trailing link 29 positioned on the front side of the lower lateral link 27.

The two upper links positioned on the upper side include an upper lateral link 30, and an upper trailing link 31 positioned on the front side of the upper lateral link 30.

The lower lateral link 27 extends from a mounting portion 32 toward the vehicle-body outer side in the vehicle width direction, and an end portion 27a on the rear wheel side is connected to the wheel support member.

The toe control link 28 extends from a mounting portion toward the vehicle-body outer side to be tilted forward, and an end portion 28a on the rear wheel side is connected to the wheel support member.

The lower trailing link 29 extends from a mounting portion toward the vehicle-body outer side to be tilted rearward, and an end portion 29a on the rear wheel side is connected to the wheel support member.

The upper lateral link 30 extends from a mounting portion 33 toward the vehicle-body outer side to be tilted forward, and an end portion 30a on the rear wheel side is connected to the wheel support member.

The upper trailing link 31 extends from a mounting portion 34 toward the vehicle-body outer side to be tilted rearward, and an end portion 31a on the rear wheel side is connected to the wheel support member.

As illustrated in FIG. 2, the suspension cross member 24 is fixed to a lower portion of the rear side frame 3 via the front and rear vehicle-body mounting members 25, 26. A mounting seat 35 is provided on a lower portion of the rear side frame 3 facing the vehicle-body mounting member 25 on the front end portion in the up-down direction, and the vehicle-body mounting member 25 on the front end portion of the suspension cross member 24 is fixed to the mounting seat 35.

The rear suspension apparatus 20 includes a suspension damper 36.

The suspension damper 36 includes a strut 37, and a coil spring provided between an upper seat and a lower seat in a tensioned state. An upper end portion of the suspension damper 36 is attached to the rear side frame 3, and a lower end portion of the suspension damper 36 is attached to the lower lateral link 27.

In other words, the multi-link rear suspension apparatus 20 has a total of five sets of suspension links (a total of five sets, that is, the lower lateral links 27, the toe control links 28, the lower trailing links 29, the upper lateral links 30, and the upper trailing links 31), and each of those suspension links are provided so as to extend from a lower position of a wheel well to the vehicle-width-direction inner side.

As illustrated in FIG. 4, a stabilizer 40 is held on rear portions of the side cross members 23 with use of brackets 38 and holding tools 39.

The stabilizer 40 suppresses the roll angle (for example, the vehicle body is tilted when the vehicle turns a corner, and the tilt angle is referred to as a roll angle) at the time of bump or rebound of only one wheel by resistance of torsional rigidity.

On lower portions of the vehicle-body mounting members 25 on the front end portions, brackets 41 that extend from the lower portions toward the vehicle-outer-direction front sides are provided.

Out of the abovementioned suspension links (the lower lateral links 27, the toe control links 28, the lower trailing links 29, the upper lateral links 30, and the upper trailing links 31), the lower lateral links 27 serving as one set of a pair of left and right first suspension links are each configured in a U-shape in cross-section of which upper surface is opened as illustrated in FIG. 5.

In other words, as illustrated in FIG. 5, the lower lateral link 27 is configured by connecting a front wall 27b, a bottom wall 27c (see FIG. 2), and a rear wall 27d to each other in a U-shape in cross-section, and includes a flange portion 27e that extends to the vehicle front side from an upper end of the front wall 27b, and a flange portion 27f that extends to the vehicle rear side from an upper end of the rear wall 27d.

As illustrated in FIG. 5, the front and rear flange portions 27e, 27f in the upper surface of the lower lateral link 27 fix an upper wall member 27h having a long hole 27g through which the strut 37 of the suspension damper 36 is inserted by welding. By the upper wall member 27h, the rigidity of the lower lateral link 27 is improved while the up-down displacement of the lower lateral link 27 is tolerated.

As illustrated in FIG. 1, FIG. 2, and FIG. 5, on a rear side portion of the lower lateral link 27, a first undercover member 51 that covers a vehicle-body lower surface so as to be flush with a lower surface of the lower lateral link 27, in other words, a lower surface of the bottom wall 27c is provided.

As a result, the deterioration of the aerodynamic characteristics is suppressed since the first undercover member 51 saves the space as a result of effectively utilizing the lower surface of the lower lateral link 27 by the first undercover member 51 being flush with the lower surface of the lower lateral link 27. In other words, by using the lower surface of the lower lateral link 27 as a part of the undercover portion, the area of the first undercover member 51 is reduced by the amount, thereby reducing space. In addition, a case where underfloor traveling air becomes entrained by the rear suspension apparatus 20 and peripheral parts thereof at the first undercover member 51 is suppressed.

As illustrated in FIG. 5, the first undercover member 51 includes a bottom wall 51a, a plurality of truncated-cone-shaped mounting seats 51b formed to be raised upward from the bottom wall 51a, and a rib 51c that radially extend and connect outer peripheral portions of the mounting seats 51b and the bottom wall 51a to each other.

Meanwhile, a plurality of mounting pieces 42 are integrally provided on the rear wall 27d of the lower lateral link 27. The first undercover member 51 is mounted on the lower lateral link 27 by connecting and fixing the mounting seat 51b of the first undercover member 51 to the mounting pieces 42 of the lower lateral link 27 with use of mounting members 43 such as bolts and nuts.

As illustrated in FIG. 1 and FIG. 5, out of the abovementioned suspension links (the lower lateral link 27, the toe control link 28, the lower trailing link 29, the upper lateral link 30, and the upper trailing link 31), a second undercover member 52 that covers a vehicle-body lower surface so as to be flush with the lower surface of the lower lateral link 27 is provided on each of the lower trailing links 29 serving as another set of a pair of left and right second suspension links positioned on the vehicle front side of the lower lateral link 27.

As a result, the deterioration of the aerodynamic characteristics is further suppressed by the second undercover member 52 and the first undercover member 51 positioned on the front side and the rear side.

As illustrated in FIG. 5, the second undercover member 52 includes a bottom wall 52a, a plurality of truncated-cone-shaped mounting seats 52b formed to be raised upward from the bottom wall 52a, and a rib 52c that radially extend and connect outer peripheral portions of the mounting seats 52b and the bottom wall 52a to each other.

Meanwhile, the lower trailing link 29 is formed in an inverted U-shape in cross-section. A plurality of mounting pieces 44 that extend from lower ends of a front wall and a rear wall of the lower trailing link 29 front-rear direction are integrally formed. The second undercover member 52 is mounted on the lower trailing link 29 by connecting and fixing the mounting seat 52b of the second undercover member 52 to the mounting pieces 44 of the lower trailing link 29 with use of mounting members 45 such as bolts and nuts.

FIG. 6 is a lower perspective view of the second undercover member or structure 52 according to some embodiments of the present disclosure. As illustrated in the same drawing, on a lower surface of the second undercover member 52, a plurality of ribs 52d that extend in the front-rear direction of the vehicle so as to protrude to the vehicle lower side are provided in parallel to each other.

As a result, a case where underfloor traveling air that flows toward the rear side from the front side through a lower portion of the second undercover member 52 is released to the left and right in the vehicle width direction is suppressed by the plurality of ribs 52d, thereby improving the rectification effect. In addition, the rigidity of the second undercover member 52 is improved by the ribs 52d.

As illustrated in FIG. 1, third undercover members or structures 53 that cover the vehicle-body lower surface are provided on the vehicle-width-direction inner sides of the second undercover members 52, the vehicle-width-direction inner sides of proximal-end-side vehicle front portions of the lower lateral links 27, and the vehicle-width-direction inner sides of the mounting portions 32 of the lower lateral link 27.

As a result, the rectification effect of the underfloor traveling air is further improved together with each of the first and second undercover members 51, 52 serving as other undercover members.

As illustrated in FIG. 4, the third undercover members 53 are supported by the suspension cross member 24 via stays 46 positioned in lower front portions of the side cross members 23, and support brackets 47 positioned on the lower side close to the vehicle-width-direction end portions of the front cross member 21 in the suspension cross member 24.

Incidentally, as illustrated in FIG. 3 and FIG. 5, the lower surface of the lower lateral link 27 serving as the first suspension link includes, on the free end side thereof, a curvature shape portion 48 that protrudes to lower side, and a curvature shape portion 49 that protrudes upward from the curvature shape portion 48 to a longitudinal-direction intermediate portion of the lower lateral link 27.

On the bottom wall 51a of the first undercover member 51, curvature portions 54, 55 are provided along the curvature shape portions 48, 49 of the lower lateral link 27. As a result, the curvature portions 54, 55 of the first undercover member 51 extend along the curvature shapes of the lower surface of the lower lateral link 27 serving as the first suspension link, and the rectification function of the underfloor traveling air is ensured.

As illustrated in FIG. 1, on a lower left portion of the vehicle, a fourth undercover member 56 that covers the vehicle-body lower surface from a lower end portion of the tunnel portion 9 on the vehicle-width-direction left side thereof to a lower portion of a side-sill outer portion is provided on the front side of each of the second and third undercover members 52, 53.

Similarly, as illustrated in FIG. 1, on a lower right portion of the vehicle, a fifth undercover member 57 that covers the vehicle-body lower surface from a lower end portion of the tunnel portion 9 on the vehicle-width-direction right side thereof to a lower portion of a side-sill outer portion is provided on the front side of each of the second and third undercover members 52, 53. Each of those fourth and fifth undercover members 56, 57 is mounted on and supported by the body.

In the drawings, an arrow F indicates the vehicle front side, an arrow R indicates the vehicle rear side, an arrow IN indicates the inner side in the vehicle width direction, an arrow OUT indicates the outer side in the vehicle width direction, and an arrow UP indicates the vehicle upper side.

As above, the lower vehicle-body structure of the vehicle according to the present embodiment, in which the plural sets of suspension links (see each of the links 27 to 31) included in the rear suspension apparatus 20 are provided so as to extend to the vehicle-width-direction inner side from the lower position of the respective wheel wells, is characterized in that the set of a pair of left and right first suspension links (lower lateral links 27) out of the abovementioned suspension links (each of the links 27 to 31) is respectively configured in a U-shape of which upper surface is opened in cross-section, and the first undercover member 51 that covers the vehicle-body lower surface so as to be flush with the lower surface of each of the first suspension links (lower lateral links 27) is provided on the rear side portion of the first suspension link (lower lateral link 27) (see FIG. 1 to FIG. 4).

According to the lower vehicle-body structure of the vehicle as above, the deterioration of the aerodynamic characteristics can be suppressed by the space-saving first undercover member 51 effectively utilizing the lower surface of the first suspension link (lower lateral link 27) by the first undercover member 51 flush with the lower surface of the first suspension link (lower lateral link 27).

In other words, the lower surface of the first suspension link (lower lateral link 27) is utilized as a part of the undercover portion. Therefore, the area of the first undercover member 51 can be reduced by the amount, thereby saving space. In addition, a case where the underfloor traveling air becomes entrained by the rear suspension apparatus 20 and peripheral parts thereof can be suppressed at the first undercover member 51.

The first undercover member 51 is provided on the rear side portion of the lower lateral link 27 in the abovementioned embodiment, but a structure in which the first undercover member 51 is provided on a front side portion of the lower lateral link 27 may be employed.

In the lower vehicle-body structure of the vehicle, the second undercover member 52 that covers the vehicle-body lower surface so as to be flush with the lower surface of the abovementioned first suspension link (lower lateral link 27) is provided on each of another set of a pair of left and right second suspension links (lower trailing links 29) positioned on the vehicle front side of the abovementioned first suspension link (lower lateral link 27) out of the abovementioned suspension links (see each of the links 27 to 31) (see FIG. 1 and FIG. 2).

According to the lower vehicle-body structure of the vehicle, the deterioration of the aerodynamic characteristics can be further suppressed by the second undercover member 52 and the first undercover member 51 positioned on the front side and the rear side.

In the lower vehicle-body structure of the vehicle, the third undercover member 53 that covers the vehicle-body lower surface is provided on at least the vehicle-width-direction inner side of the second undercover member 52 (see FIG. 1).

According to the lower vehicle-body structure of the vehicle, the rectification effect of the underfloor traveling air can be further improved together with each of the first and second undercover members 51, 52 serving as other undercover members.

In the lower vehicle-body structure of the vehicle, the curvature portions 54, 55 are formed in the first undercover member 51 along the curvature shape of the lower surface of the abovementioned first suspension link (lower lateral link 27) (see FIG. 3 and FIG. 5).

According to the lower vehicle-body structure of the vehicle, the curvature portions 54, 55 of the first undercover member 51 extend along the curvature shape of the lower surface of the first suspension link (lower lateral link 27), and hence the rectification function of the underfloor traveling air can be ensured.

In the lower vehicle-body structure of the vehicle, on the lower surface of the second undercover member 52, the plurality of ribs 52d that extend in the front-rear direction of the vehicle so as to protrude to the vehicle lower side are provided (see FIG. 1 and FIG. 6).

According to the lower vehicle-body structure of the vehicle as above, a case where the underfloor traveling air that flows toward the rear side from the front side through the lower portion of the second undercover member 52 is released to the left and right in the vehicle width direction can be suppressed by the ribs 52d, thereby improving the rectification effect.

In terms of correspondence between the configuration of the present disclosure and the abovementioned embodiment, the suspension links of the present disclosure correspond to the lower lateral link 27, the toe control link 28, the lower trailing link 29, the upper lateral link 30, and the upper trailing link 31 of the present embodiment. Similarly, one set of a pair of left and right first suspension links corresponds to the lower lateral links 27, and the other set of a pair of left and right second suspension links corresponds to the lower trailing links 29. However, the present disclosure is not limited to the configuration of the abovementioned embodiment.

For example, in the abovementioned embodiment, the multi-link rear suspension apparatus 20 including the lower lateral link 27, the toe control link 28, the lower trailing link 29, the upper lateral link 30, and the upper trailing link 31 has been exemplified as the rear suspension apparatus 20. However, the present disclosure can be applied to a lower vehicle-body structure of a vehicle including a double-wishbone rear suspension apparatus including a pair of left and right front-side lower arms, a pair of left and right rear-side lower arms, a pair of left and right front-side upper arms, a pair of left and right rear-side upper arms, and a pair of left and right control links.

INDUSTRIAL APPLICABILITY

As described above, one embodiment of the present disclosure is useful for a lower vehicle-body structure of a vehicle in which plural sets of suspension links included in a rear suspension apparatus are provided so as to extend to the vehicle-width-direction inner side from a lower position of respective wheel wells.

REFERENCE SIGNS LIST

20 Rear suspension apparatus
27 Lower lateral link (first suspension link)
28 Toe control link (suspension link)
29 Lower trailing link (second suspension link)
30 Upper lateral link (suspension link)
31 Upper trailing link (suspension link)
51 First undercover member
52 Second undercover member
52d Rib
53 Third undercover member
54, 55 Curvature portion

The invention claimed is:
1. A lower vehicle-body structure of a vehicle, the lower vehicle-body structure comprising plural sets of suspension links included in a rear suspension apparatus, the plural sets of suspension links being provided so as to extend to a vehicle-width-direction inner side from a lower position of respective wheel wells,
wherein:

a set of a pair of left and right first suspension links out of the suspension links is respectively configured in a U-shape of which upper surface is opened in cross-section; and a first undercover structure that covers a vehicle-body lower surface so as to be flush with a lower surface of one of the first suspension links is provided on a side portion of the one of the first suspension links, wherein the first undercover structure includes a bottom wall, a plurality of truncated-cone-shaped mounting seats formed to be raised upward from the bottom wall, and a rib that radially extends and connects outer peripheral portions of the mounting seats and the bottom wall to each other, and wherein a curvature portion is formed in the first undercover structure along a curvature shape of the lower surface of the one of the first suspension links, and the curvature portion is curved in the vertical direction.

2. The lower vehicle-body structure of the vehicle according to claim 1, wherein a second undercover structure that covers the vehicle-body lower surface so as to be flush with the lower surface of the one of the first suspension links is provided on each of another set of a pair of left and right second suspension links positioned on a vehicle front side of the first suspension links out of the suspension links.

3. The lower vehicle-body structure of the vehicle according to claim 2, wherein a third undercover structure that covers the vehicle-body lower surface is provided on at least a vehicle-width-direction inner side of the second undercover structure.

4. The lower vehicle-body structure of the vehicle according to claim 3, wherein a plurality of ribs that extend in a front-rear direction of the vehicle so as to protrude to a vehicle lower side are provided on a lower surface of the second undercover structure.

5. The lower vehicle-body structure of the vehicle according to claim 2, wherein a plurality of ribs that extend in a front-rear direction of the vehicle so as to protrude to a vehicle lower side are provided on a lower surface of the second undercover structure.

6. The lower vehicle-body structure of the vehicle according to claim 3, wherein a plurality of ribs that extend in a front-rear direction of the vehicle so as to protrude to a vehicle lower side are provided on a lower surface of the second undercover structure.

7. The lower vehicle-body structure of the vehicle according to claim 2, wherein the second undercover structure is below the second suspension links.

8. The lower vehicle-body structure of the vehicle according to claim 3, wherein the second undercover structure is below the second suspension links.

9. The lower vehicle-body structure of the vehicle according to claim 4, wherein the second undercover structure is below the second suspension links.

10. The lower vehicle-body structure of the vehicle according to claim 3, wherein the third undercover structure is below a suspension cross structure.

11. The lower vehicle-body structure of the vehicle according to claim 4, wherein the third undercover structure is below a suspension cross structure.

12. The lower vehicle-body structure of the vehicle according to claim 1, further comprising:

a lower trailing link in an inverted U-shape in cross-section, the lower trailing link including a plurality of mounting pieces that extend from lower ends of a front wall and a rear wall of the lower trailing link front-rear direction; and a second undercover structure on the lower trailing link by connecting and fixing the mounting seats of the first undercover structure to the mounting pieces of the lower trailing link.

13. The lower vehicle-body structure of the vehicle according to claim 1, wherein:

the lower surface of the one of the first suspension links includes a first curvature shape portion that protrudes to lower side on the free end side thereof and a second curvature shape portion that protrudes upward from the first curvature shape portion to a longitudinal-direction intermediate portion of the one of the first suspension links, and the curvature portion of the first undercover structure is formed along the first curvature shape portion and the second curvature shape portion.

14. A lower vehicle-body structure of a vehicle, the lower vehicle-body structure comprising plural sets of suspension links included in a rear suspension apparatus, the plural sets of suspension links being provided so as to extend to a vehicle-width-direction inner side from a lower position of respective wheel wells, wherein:

a set of a pair of left and right first suspension links out of the suspension links is respectively in a U-shape of which upper surface is opened in cross-section;

a set of a pair of left and right second suspension links out of the suspension links is provided on a front side of the vehicle with respect to the first suspension links; and a second undercover structure that covers a vehicle-body lower surface so as to be flush with the lower surface of one of the first suspension links is provided on each of the second suspension links, wherein the second undercover structure includes a bottom wall, a plurality of truncated-cone-shaped mounting seats formed to be raised upward from the bottom wall, and a rib that radially extends and connects outer peripheral portions of the mounting seats and the bottom wall to each other, and a curvature portion is formed in a first undercover structure along a curvature shape of the lower surface of the one of the first suspension links, and the curvature portion is curved in the vertical direction.

15. The lower vehicle-body structure of the vehicle according to claim 14, wherein a third undercover structure that covers the vehicle-body lower surface is provided on at least a vehicle-width-direction inner side of the second undercover structure.

16. A lower vehicle-body structure of a vehicle, the lower vehicle-body structure comprising plural sets of suspension links included in a rear suspension apparatus, the plural sets of suspension links being provided so as to extend to a vehicle-width-direction inner side from a lower position of respective wheel wells, wherein:

a set of a pair of left and right first suspension links out of the suspension links is respectively configured in a U-shape of which upper surface is opened in cross-section;

a first undercover structure that covers a vehicle-body lower surface so as to be flush with a lower surface of one of the first suspension links is provided on a side portion of the one of the first suspension links;

a second undercover structure that covers the vehicle-body lower surface so as to be flush with the lower surface of the one of the first suspension links is provided on each of another set of a pair of left and right second suspension links positioned on a vehicle front side of the first suspension links out of the suspension links;

each of the first undercover structure and the second undercover structure includes a bottom wall, a plurality of mounting seats formed to be raised upward from the bottom wall, and ribs that extend and connect outer peripheral portions of the mounting seats and the bottom wall to each other;

a number of the ribs connecting to one mounting seat on the first undercover structure is more than that on the second undercover structure; and a curvature portion is formed in the first undercover structure along a curvature shape of the lower surface of the one of the first suspension links, and the curvature portion is curved in the vertical direction.

* * * * *